(12) United States Patent
Thoms

(10) Patent No.: US 11,779,864 B2
(45) Date of Patent: Oct. 10, 2023

(54) SCREEN FOR HYDRAULIC FLUID

(71) Applicant: DANFOSS POWER SOLUTIONS GMBH & CO OHG, Neumunster (DE)

(72) Inventor: Reinhardt Thoms, Holzbunge (DE)

(73) Assignee: Danfoss Power Solutions GMBH & CO OHG, Keumunster (DE)

( * ) Notice: Subject to any disclaimer, the term of this patent is extended or adjusted under 35 U.S.C. 154(b) by 300 days.

(21) Appl. No.: 16/184,278

(22) Filed: Nov. 8, 2018

(65) Prior Publication Data
US 2019/0070532 A1    Mar. 7, 2019

Related U.S. Application Data

(63) Continuation-in-part of application No. 14/732,027, filed on Jun. 5, 2015, now Pat. No. 10,252,195.

(30) Foreign Application Priority Data

Jun. 13, 2014 (DE) .......................... 102014211395.4

(51) Int. Cl.
| | |
|---|---|
| B01D 29/31 | (2006.01) |
| B01D 39/10 | (2006.01) |
| F15B 21/04 | (2019.01) |
| F15B 21/041 | (2019.01) |
| B01D 35/02 | (2006.01) |
| B01D 29/03 | (2006.01) |

(52) U.S. Cl.
CPC .............. *B01D 29/31* (2013.01); *B01D 29/03* (2013.01); *B01D 35/02* (2013.01); *B01D 39/10* (2013.01); *F15B 21/041* (2013.01); *B01D 2201/184* (2013.01)

(58) Field of Classification Search
CPC .. B01D 2201/184; B01D 29/03; B01D 29/31; B01D 35/02; B01D 39/10; F15B 21/041
See application file for complete search history.

(56) References Cited

U.S. PATENT DOCUMENTS 2,662,230 A * 12/1953 Borman .................. E03C 1/262
                                                            4/287
3,458,050 A * 7/1969 Cooper .................. B01D 35/02
                                                            210/448

(Continued)

FOREIGN PATENT DOCUMENTS

DE        102005032842 A1 * 1/2007 .............. B22F 10/20

OTHER PUBLICATIONS

Danfoss, "Is water hydraulics in your future?" Machine Design, Oct. 12, 2006, accessed on the Internet at https://www.machinedesign.com/archive/article/21813144/is-water-hydraulics-in-your-future, on Jun. 17, 2020, 4 pages. (Year: 2006).*

*Primary Examiner* — Dirk R Bass
(74) *Attorney, Agent, or Firm* — ZarleyConley PLC

(57) ABSTRACT

The invention relates to a high-pressure hydraulic fluid screening element (1) for inserting into a hydraulic line or into a hydraulic connection of a hydraulic device, having an annular main body (2), which is aligned with respect to its axis of rotation (9) in a longitudinal direction (5). The outside diameter of the main body (2) is greater than its axial length. The inner cross section of the main body (2) is covered over by a screening region (3), which is provided with a multiplicity of apertures (4). In this case, the main body (2) and the screening region (3) are produced integrally by the powder injection-molding process.

17 Claims, 2 Drawing Sheets

(56) References Cited

U.S. PATENT DOCUMENTS

| | | | | |
|---|---|---|---|---|
| 4,100,248 | A * | 7/1978 | Adams | B01D 29/012 |
| | | | | 264/273 |
| 5,449,459 | A * | 9/1995 | Glaser | B01D 35/02 |
| | | | | 425/197 |
| 5,584,998 | A * | 12/1996 | Teter | B01D 24/40 |
| | | | | 210/405 |
| 6,669,844 | B2 * | 12/2003 | Strohm | B01D 25/02 |
| | | | | 210/224 |
| 6,920,784 | B2 * | 7/2005 | Abdolhosseini | F02M 33/00 |
| | | | | 73/114.31 |
| 7,127,908 | B2 * | 10/2006 | Flaugher | B01D 53/261 |
| | | | | 62/271 |
| 8,833,447 | B2 * | 9/2014 | Mussig | B01D 29/46 |
| | | | | 166/244.1 |
| 10,252,195 | B2 * | 4/2019 | Thoms | F15B 21/04 |
| 2004/0069704 | A1 * | 4/2004 | Yamaguchi | F02M 47/027 |
| | | | | 210/497.01 |
| 2010/0077928 | A1 * | 4/2010 | Schmed | B65D 85/8055 |
| | | | | 99/295 |
| 2011/0168029 | A1 * | 7/2011 | Fulco | A47J 31/446 |
| | | | | 99/295 |
| 2013/0327722 | A1 * | 12/2013 | Siddiqui | A61M 1/3633 |
| | | | | 210/767 |
| 2015/0360154 | A1 * | 12/2015 | Thoms | F15B 21/04 |
| | | | | 210/167.01 |

\* cited by examiner

SCREEN FOR HYDRAULIC FLUID

CROSS REFERENCE TO RELATED APPLICATION

This application is a continuation-in-part of U.S. Ser. No. 14/732,027 filed Jun. 5, 2015 which claims the benefit of German Patent Application No. DE 10 2014 211 395.4 filed Jun. 13, 2014, the contents of these applications are hereby incorporated by reference in their entirety.

BACKGROUND OF THE INVENTION

The invention relates to a hydraulic fluid screening element for inserting into a hydraulic line or into a hydraulic connection of a hydraulic device, in particular for inserting into hydraulic connections of hydraulic valves.

Because of their power density and their efficiencies, hydraulic systems or drives are today used in a wide variety of applications. In hydraulic systems, the delivery medium serves not only for power transmission, it also serves for generating and transmitting control signals. Used for this in particular are valves of many different types. It is necessary here to protect both the power-transmitting hydraulic circuits and the valves from contamination. Contamination leads to wear or even to damage and failure of the hydraulic systems, with corresponding consequential costs. The contamination of valves that are relevant to safety not only leads to them becoming worn, but also leads to risks for life and limb if it causes the control of the hydraulic systems to fail. Therefore, in all hydraulic systems there are powerful filters or filter systems that provide the required purity of the delivery medium. These filters are designed for filtering out extremely fine dirt particles from the delivery medium.

Fine filtering is a continuous process. When particles are introduced, for example as a result of wear, a specific purity class of the delivery medium must be maintained. The fine filters are arranged in hydraulic systems in such a way that they ensure an approximately constant good degree of purity of the delivery medium by continuous filtering. They consequently protect all of the elements of the hydraulic systems through which oil flows, including control valves, from dirt. The resultant level of contamination depends on the capability of the filter system, on the amount of particles produced within a period of time and the frequency of the circulation of the delivery medium.

Dirt in the widest sense comprises, for example, introduced particles that may originate from production residues but also from the wear of machine components. Particularly drastic effects are caused by the introduction of particles that may originate for example from coarse wear or the destruction of parts. These are generally particles of a kind that do not occur during normal operation but are so large that they can block assemblies such as valves, servo adjustment devices or simply just delivery-medium-carrying channels of a relatively small diameter. This type of contamination is an exceptional state that fine filters cannot quickly counter, because such fine filters are usually arranged at a central location and not in individual connecting lines or ahead of valves to protect them from malfunctioning or blocking if particles are introduced there.

For this reason, some valves relevant to safety are provided with separate filters, which inhibit or restrict the introduction of particles into particularly neuralgic functions. This type of filter does not serve for fine filtering but is intended to keep away particles that have a blocking effect. They are of course designed in terms of the filtering effect in such a way that less harmful fine particles are still allowed through and only particles that pose a risk are kept back. Because of the larger passages for allowing the delivery medium through, these filters are often also referred to as screens in the widest sense, as they are hereinafter in the description of the present invention.

There are hydraulic fluid screens of many different configurations. Very often, metal gauzes are used. There are single-layer and multi-layered screens. In the case of multi-layer screens, certain layers serve for improving the robustness and other layers serve for the actual function of providing protection from contamination. Other screens are elements that are provided with apertures, these being drilled, punched or introduced by means of laser or some other kind of machining. Water-jet cutting is also a suitable technology, but is not preferred because of the costs. There are also filters known as slot filters. In this case, structural elements are arranged in such a way that the inflow of delivery medium is only allowed through specifically remaining slots. A simple embodiment consists for example of a square profile that is arranged centrally in a bore in such a way that its four corners are supported on the wall of the bore and the side surfaces form slots by their distance from the wall of the bore. Other filters in turn consist of porous material, the filter element of which may be formed as a body, but also by a layering of fibres, spheres or the like that have a filtering effect.

All screening structures present a more or less viscosity-dependent hydraulic resistance. With increasing through-flow, the pressure drop across the screen increases. The higher pressure ahead of the screen puts load on the screen, and in the worst case can lead to its partial or even complete destruction. At the least, it then no longer has its screening function, which can be very difficult to detect in a hydraulic device and represents a concealed safety risk. There may, however, also be the release of already trapped particles, or the fragments of a destroyed screen may themselves become a high risk for the function of the hydraulic device.

Therefore, screening structures have to meet a series of requirements that are difficult to reconcile. Screens should be robust with respect to loads caused by the pressure of the delivery medium; they should be chemically resistant; they should have small passages of the same cross section; in spite of the small passages, their hydraulic resistance should be as low as possible and depend only little on the viscosity of the delivery medium; they must not under any circumstances contribute to contamination themselves; the structures should of course be robust, take up little overall space, be able to be produced inexpensively and be easy to install. In addition, they should be easy to clean and/or easy to exchange.

Screening structures of metal gauze are often not sufficiently robust and themselves represent a risk of contamination if they are damaged or even destroyed. Metal gauzes for screens/filters are cut out from large-area webs of gauze, the usually circular blank that is cut out giving rise to very short metal wires, which under loading become detached from the gauze structure and thus represent a risk for the functional capability of the hydraulic device.

Slot filters of the type described above require laborious processing in their production but also of the installation space. They require a large overall space and are expensive, but very robust. Punched or drilled elements often cannot be produced very finely. If the passages are produced by means of a laser, the associated introduction of heat reduces the robustness of the filters/screens. Lasered flat components are not very robust, but because of their thin-walled form have a low dependence of the hydraulic resistance on the viscosity of the delivery medium. In the case of thick-walled structures, the throughflow becomes laminar and the hydraulic resistance becomes great when there is a high viscosity of the delivery medium. Filters of porous material have uneven passages and are themselves a contamination risk on account of the risk of particles becoming detached.

The object of the invention is therefore to provide a hydraulic fluid screening element that is very robust, of a small form and chemically resistant, and can also be used under very high pressures. It should also be able to be produced inexpensively and be easy to install, and also allow itself to be easily cleaned.

SUMMARY OF THE INVENTION

According to claim 1, this object is achieved by a high-pressure hydraulic fluid screening element for inserting into a hydraulic line or a hydraulic connection of a hydraulic device, the screening element having an annular main body, which can be aligned with respect to its axis of rotation in a longitudinal direction, for example of a hydraulic line. The outside diameter of the main body is greater than its axial length. A screening region covers over the inner cross section of the main body and is formed integrally with the main body by the powder injection-molding process, the screening region being provided with a multiplicity of apertures.

Powder injection molding is a process in which metals or ceramics, even of very different compositions, can be bonded to form a solid body. Here we are concerned with powder injection molding in which first a metal or ceramic powder is mixed with an organic binder to form a homogeneous composition. This composition can be processed in a way analogous to the processing of plastics on injection-molding machines. In the injection-molding process, moldings that already have all the typical features of the finished component are produced. The removal of the organic binder subsequently takes place in a debinding process. The porous moldings left behind are densified, for example by sintering, with the final geometrical properties to form a solid and stable and also robust molded part. In subsequent refining processes, all conceivable thermal and surface treatments as for conventionally produced components can be applied. The material density of the components thus produced is high, and accordingly high material strengths can be achieved. Powder injection molding produces precise, filigree components that do not necessarily have to be reworked. There is therefore no need for cost-intensive (re-)working, in which burrs on the component and working residues have to be removed. The powder injection-molding process is a shaping process that allows great freedom of design, so that dimensionally and functionally optimized and stable components can be produced.

The main body of the screening element according to the invention is generally in the form of a ring or the form of a disc, the outer contour of the ring preferably being designed in the form of a circle with respect to an axis of rotation. However, when carrying out the invention it may also assume other forms, for instance oval, elliptical or angular. Depending on the height of the main body, measured in its axial longitudinal direction, the screening element may appear as a disc, as a cup or in the form of a pot, the screening region covering over and closing off the free inner region of the main body. The height, i.e. the axial length, of the screening element is however always smaller than its diameter.

For removing the untreated parts from the injection mold, demolding angles are required on the component, which is disadvantageous for some other component structures. In the case in question, however, it helps to form the passages in such a way that the viscosity dependence of the flow resistance is minimized. This is brought about by the cross section of the apertures increasing in the direction of flow of the hydraulic fluid. The demolding angle chosen for this on the mold reduces the viscosity dependence of the through-flow resistance considerably. The preferred cross-sectional widening in the direction of operational flow of hydraulic fluid through the screening element thus also prevents dirt particles from becoming wedged or jammed in the apertures, since these particles can only accumulate on the surface of the screening element on the inflow side. This also allows easy cleaning of the screening element by backflushing.

The profile of the passages is not pre-set as constant over the entire longitudinal extent of the apertures, as for example in the case of drilling. Profiles for the passages may be configured in such a way that the overall space available is optimally utilized, and at the same time a favorable ratio between the cross sections of the passage openings and those of the remaining material can be chosen, which at the same time leads to a robust design.

In a specific way of carrying out the invention it is preferred that the apertures are formed in a kidney-shaped and/or arcuate manner and are arranged circularly on multiple circles of different diameters. It is further preferred that the wall thickness between two neighboring apertures, measured in a plane perpendicular to the longitudinal direction, is less than 1 mm and that the apertures have a height, measured in the radial direction of the screening element, that is less than 0.35 mm, preferably less than 0.25 mm and particularly preferably less than 0.15 mm.

When carrying out the invention it is further preferred if the apertures are joined onto the screening region axially, radially and/or in the circumferential direction by way of rounded portions. This increases the strength of the hydraulic fluid screening element, since stress peaks and crack-forming tendencies, for example due to the notch effect, are reduced. The regions of the material remaining around the passages can be optimized with regard to the dimensional stability and robustness of the screening element. They may for example be configured as webs of different wall thicknesses or an arcuate form. It is possible to provide radii where notch effects could otherwise reduce the strength. These radii may moreover be variably configured.

The outer circumferential surface of the screening element preferably forms a conical surface, which has its smallest diameter at the end region of the main body on the outflow side, facing away from the screening region. With a precisely configured, not re-worked conical outside diameter, the screening element can be easily pressed in, for example in a conical installation bore of average variance, without its position in the depth of the bore being subject to any appreciable tolerance. The installation of the screening element is consequently easy and inexpensive. In most applications, no additional measures are required for fixing the screening element. It is self-evident that the concept of the invention also includes a double-sided cone on the outer surface of the main body, in the manner of a double frustum of a cone, with a common greatest diameter at which the frustums are in contact. In this exemplary embodiment it is preferred for technical production-related reasons that the screening region is at the greatest diameter of the double frustum, which may for example be at the center of the screening element, but not necessarily.

It is favorable for the load-bearing capacity of the hydraulic fluid screening element by high hydraulic pressure or by pressure surges if the screening region has, seen in the direction of throughflow, a convex dome shape, which resists the flow and the pressure of the hydraulic fluid. At least one side of the dome may be formed here in a stepped manner. The stepped formation can achieve the effect that larger dirt particles do not completely clog the apertures, so that a throughflow is still possible around them.

Suitable for the powder injection-molding process for producing hydraulic fluid screening elements according to the invention are any desired metals that are sinterable. In this specific case, reference is also made to the MIM process (Metal-Injection-Molding). Accordingly, the hydraulic fluid screening element according to the invention may be produced from a metal or metal alloy that is preferably stainless. The chosen material ensures high chemical resistance and prevents corrosion being caused by the hydraulic fluid or constituents admixed in it, such as for example additives.

The novel screen design according to the invention makes it possible to construct screens for very high pressure loads, even though the load-bearing material has only small wall thicknesses around the passages. There is no need to fear that individual particles may break out, which would lead to contamination, on account of the powder injection-molding process. Because of its robustness, the screen may also be installed in the inflow of valves, in particular control valves and safety valves, that are subjected to the loading of a surge-like, high pulsating volumetric flow.

The invention is explained in more detail below on the basis of exemplary embodiments, which are represented in the figures, in which:

DETAILED DESCRIPTION OF THE PREFERRED EMBODIMENTS

Figure 1:
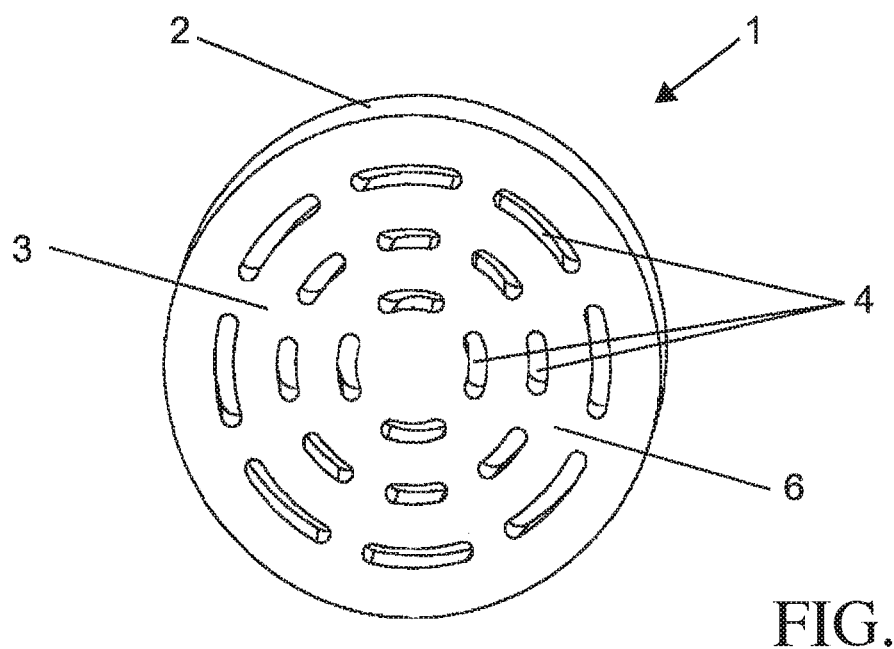
FIG. 1 shows a perspective view of a first exemplary embodiment of the hydraulic fluid screening element according to the invention.
Figure 2:
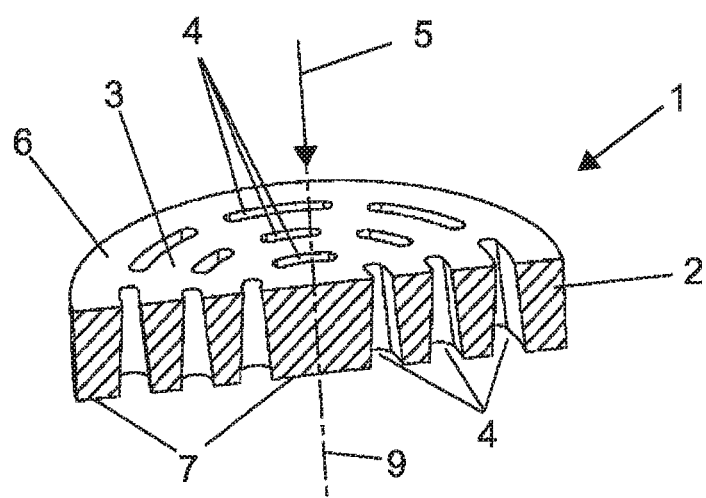
FIG. 2 shows a sectional view of a hydraulic fluid screening element according to FIG. 1.

In FIGS. 1 and 2, an embodiment of the hydraulic fluid screening element 1 according to the invention, which has a generally disc-shaped design, is represented in a perspective view. For example, it has a conical, annularly formed main body 2 in the form of the frustum of a cone, which is covered over its inner cross section by a screening region 3. The screening region 3 is provided with a multiplicity of apertures 4, which by way of example have the form of a kidney or the form of a curved oval and are arranged in multiple concentric circles. In this case, the apertures 4 are conically formed, the screening element 1 preferably being inserted into a hydraulic line in such a way that the side with the smaller passage cross sections forms the inlet side or inflow side 6 of the screening element 1, and accordingly the opposite side with the greater passage cross sections forms the outlet side or the outflow side 7 of the screening element. The preferably conical apertures 4 then determine the direction of throughflow of the hydraulic fluid to be screened, which coincides with the direction of the arrow 5. This direction also defines the longitudinal direction 5 of the hydraulic fluid screening element 1.

Figure 3:
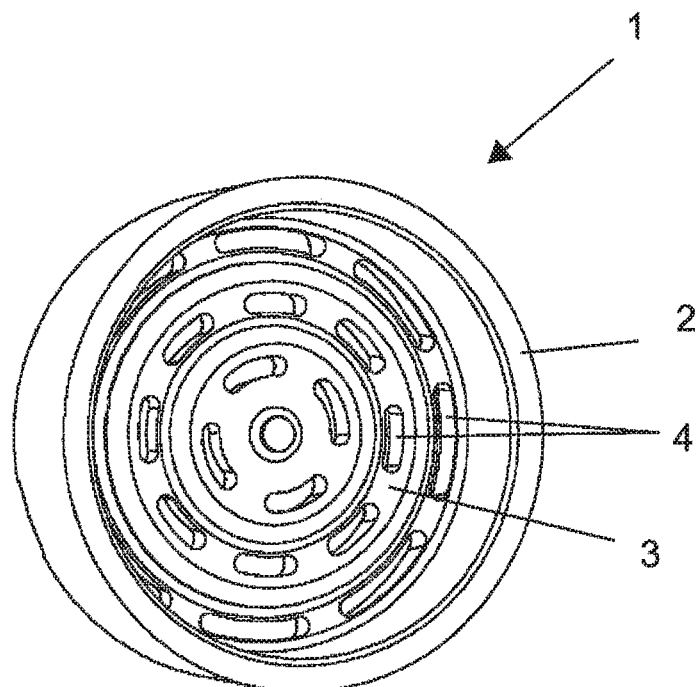
FIG. 3 shows a perspective view of a second exemplary embodiment of the hydraulic fluid screening element according to the invention.

In FIG. 3, a further exemplary embodiment of the hydraulic fluid screening element 1 according to the invention is represented in a perspective view, the same reference numerals having been assigned for the same elements as in the case of the exemplary embodiment of FIGS. 1 and 2. As a difference from the first exemplary embodiment, the exemplary embodiment shown in FIGS. 3 and 4 has a conical main body 2 in the form of a frustum of a cone and a screening region 3, which closes off the main body 2 in the manner of the bottom of a cup or a lid on one side, here the outlet side 7 of the screening element 1. The screening region 3 is provided with apertures 4, which by way of example have the form of a kidney or the form of a curved oval and are arranged in multiple concentric circles. The apertures 4 in a particular circle of the concentric circles are larger than the apertures 4 in another circle of the concentric circles, and in this way larger apertures 4 present a larger diameter circle of the concentric circles in comparison to those in a smaller diameter circle.

Figure 4:
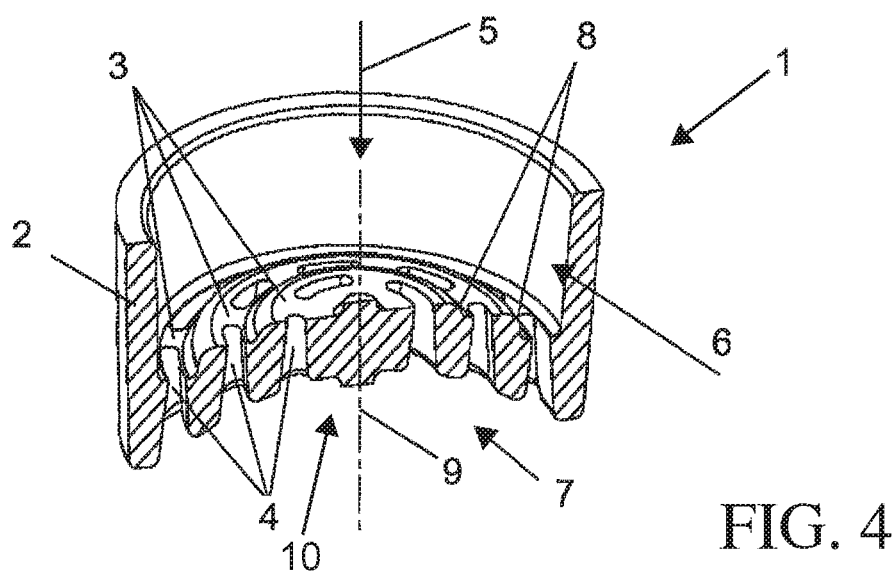
FIG. 4 shows a sectional view of a hydraulic fluid screening element according to FIG. 3.

FIG. 4 shows a cross section through the hydraulic fluid screening element 1 according to the invention shown in FIG. 3 in a perspective view. The conical main body 2 tapers in the direction of throughflow of the hydraulic fluid to be screened, which coincides with the direction of the arrow 5. This direction defines its operational inlet side 6 and outlet side 7 for the hydraulic fluid.

In the case of this exemplary embodiment of FIG. 3, the screening region 3 of the hydraulic fluid screening element 1 is formed as a dome, the inlet side 6 being convexly stepped counter to the intended direction of throughflow and the outlet side 7 corresponding in cross section substantially to a segment of a circle. Substantially means here that other, curved arc shapes are also permissible and that, in certain regions, for instance at the transition from the screening region 3 to the main body 2 or in the central region 10 thereof, there may be deviations from the form of a dome, as can be seen in the cross section shown in FIG. 4. The dome formed by the screening region 3 is consequently arranged in such a way that it resists the flow and the pressure of the hydraulic fluid, which increases its load-bearing capacity.

The apertures 4 in the screening region 3 are for example kidney-shaped and arranged in multiple concentric circular regions. The transitions between the respective circular regions are stepped, the edges of the steps 8 being rounded. The apertures 4 have in the direction of throughflow 5 a cross section that widens in the direction of flow. The cross section of the apertures 4 consequently increases in the direction of flow of the hydraulic fluid. The edges of the apertures 4 are preferably rounded, which in FIG. 4 is represented by way of example in the sectional representation.

On account of their shaping and being produced by the powder injection-molding process, the hydraulic fluid screening elements 1 shown by way of example in these exemplary embodiments are particularly simple and robust, and consequently particularly suitable for use in hydraulic systems, which are for example operated under high pressure. They do not have a tendency for cracks to form or individual particles to become detached, even under high and alternating loading, and moreover can be easily fitted, in particular by pressing in, especially in the case of a conical structural form, and, on account of the conical apertures, can also be easily cleaned. The hydraulic fluid screening elements 1 are alternatively formed by MIM, additive manufacture, additive manufacturing 3D printing in metal or bi-metal, 3D printing by way of layer forming, or sintering.

What is claimed is:

1. A hydraulic fluid screening element for insertion into a hydraulic line, comprising:
    a main body having a screen that covers an inner cross section of the main body across a bottom of the main body and is formed integrally with the main body;
    the screen having an inlet side and and outlet side, wherein the outlet side extends across the bottom of the main body; and
    apertures extending through the screen from the inlet side to the outlet side, wherein the apertures have a cross section that widens from the inlet side to the outlet side;
    wherein the inlet side of the screen is formed as a convex dome in relation to the bottom of the main body, the outlet side of the screen is formed in cross section substantially to a segment of circle, and the screen closes off the bottom of the main body;
    wherein the main body has a conical surface in a form of a frustum of a cone such that the main body has a smallest diameter abutting the screen.

2. The hydraulic fluid screening element of claim 1 wherein the apertures have a form of a kidney shape and are arranged in multiple concentric circles.

3. The hydraulic fluid screening element of claim 1 wherein the main body tapers in a direction of throughflow of hydraulic fluid to be screened.

4. The hydraulic fluid screening element of claim 1 wherein the apertures form multiple concentric circular regions and transitions between a set of multiple circular regions of the convex dome formed by the screen that are stepped.

5. The hydraulic fluid screening element of claim 1 wherein the hydraulic fluid screening element is produced by a powder injection-molding process.

6. The hydraulic fluid screening element of claim 1 wherein the hydraulic fluid screening element is produced from a material selected from a group consisting of a stainless metal and stainless metal alloy by a Metal-Injection-Molding (MIM) process.

7. The hydraulic fluid screening element of claim 4 wherein the apertures have rounded edges.

8. The hydraulic fluid screening element of claim 1 wherein each of the apertures are conically formed.

9. The hydraulic fluid screening element of claim 1 wherein when the screening element is positioned in the hydraulic line, the apertures determine a direction of throughflow through the inlet side to the outlet side.

10. The hydraulic fluid screening element of claim 1 wherein each of the apertures extend through the screen in a longitudinal direction.

11. The hydraulic fluid screening element of claim 1 wherein the main body extends upwardly from the screen such that the outlet side of the screen is at a bottommost position of the main body in a manner of a bottom of a cup.

12. The hydraulic fluid screening element of claim 1 wherein the screen is convexly stepped counter to an intended direction of throughflow on the inlet side.

13. The hydraulic fluid screening element of claim 12 wherein the apertures form multiple concentric circular regions between circular regions of the screen that are stepped.

14. A hydraulic fluid screening element for insertion into a hydraulic line, comprising:
    a main body shaped in a form of a frustrum of a cone, wherein a bottom of the main body has a smallest diameter;
    a screen having an inlet side and an outlet side, wherein the screen is formed in cross section substantially to a segment of a circle;
    the screen closes off the bottom of the main body in a manner of a cup between an inlet side and an outlet side of the hydraulic fluid screening element, wherein the outlet side extends across the bottom of the main body below the inlet side of the screen; and
    apertures extend through the screen from the inlet side to the outlet side of the screen, wherein the apertures have a cross section that widens from the inlet side to the outlet side;
    wherein the screen is convexly stepped in a shape of a convex dome in relation to the bottom of the main body on the inlet side;
    wherein the apertures form multiple concentric circular regions between circular regions of the screen that are stepped.

15. A hydraulic fluid screening element for insertion into a hydraulic line, comprising:
    a main body shaped in a form of a fustrum of a cone;
    a screen that closes off the main body across a bottom of the main body, wherein the main body has a smallest diameter abutting the screen;
    the screen having an inlet side and outlet side, wherein the outlet side extends across and between the bottom of the main body and is positioned below the inlet side of the screen; and
    apertures extending through the screen from the inlet side to the outlet side, wherein the apertures have a cross section that widens from the inlet side to the outlet side;
    wherein the screen is convexly stepped in a shape of a convex dome in relation to the bottom of the main body on the inlet side.

16. The hydraulic fluid screening element of claim 15 wherein each of the apertures extend through the screen in a longitudinal direction.

17. The hydraulic fluid screening element of claim 15 further comprising the hydraulic fluid screening element positioned in the hydraulic line such that the apertures determine a direction of throughflow through the inlet side to the outlet side.

* * * * *